W. H. Capewell.
Glass Maker's Pot.

Nº 71578      Patented Dec. 3, 1867.

Witnesses: Philip Farley, Frank Garde

Wm. H. Capewell
per Francis D. Pastorius
atty.

United States Patent Office.

WILLIAM H. CAPEWELL, OF WESTVILLE, NEW JERSEY.

Letters Patent No. 71,578, dated December 3, 1867.

IMPROVED GLASS-MAKER'S POT.

*The Schedule referred to in these Letters Patent and making part of the same.*

TO ALL WHOM IT MAY CONCERN:

Be it known that I, WILLIAM H. CAPEWELL, of Westville, in the county of Gloucester, and State of New Jersey, have invented a new and improved Glass-Maker's Pot; and I do hereby declare that the following is a full, clear, and exact description of the same, reference being had to the accompanying drawing, and to the letters of reference marked thereon.

My invention relates to a cup or shield which surrounds the waist and bottom of a glass-maker's pot, to increase its durability; and in the event of the pot cracking while in the furnace, the glass contained in it will be caught in the said cup, substantially as is hereinafter shown. On reference to the accompanying drawing, which forms a part of this specification—

Similar letters refer to similar parts in the two views.

Figure 1:
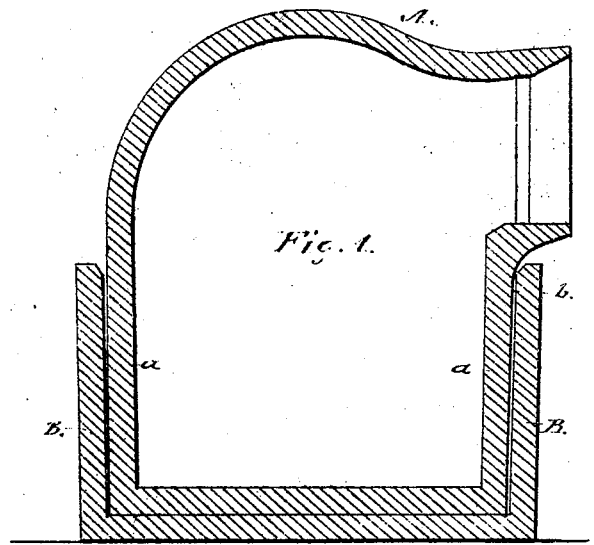
Figure 1 is a sectional view.
Figure 2:
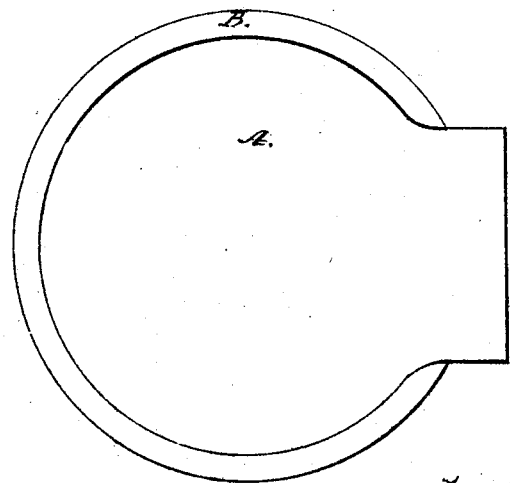
Figure 2 is a plan view.

No branch of glass-manufacture requires greater care than the construction of melting-pots. They must be made of the most infusible clays, and be kept for a long while in pot-arches before introducing them into the melting-oven. In order gradually to prepare them to bear the high temperature of the oven, and render them stronger, they are introduced only after having been subjected to a very high temperature. After the pots are set in the oven, the attendant deposits the frit or material in them. After the addition of each shovelful he waits until the material is melted before adding another, and so on, until the pot is filled; (in some instances the pots are filled at one charging.) When the glass is sufficiently fused, the temperature of the furnace is lowered, in order to bring the glass to a consistency fit for working. Each pot should serve several meltings, but such is not the case. The repeated opening of the oven to deposit the material in the pots, and observe its condition, removing clinkers from the fires, tends to make the temperature of the oven variable, and causes the pots to contract and expand suddenly, thereby cracking them, and causing the glass to run to waste. (Some glass-makers assert that the breakage of pots is caused by the clays of which they are made not being homogeneous.)

To prevent the pots from breaking or cracking, I surround the waist $a$ and bottom of each pot A with a cup or shield, B, the waist of the pot taking into the cup, its bottom resting on the bottom of the cup. To prevent their surfaces from becoming fixed, a space, $b$, intervenes. The cup B, surrounding the waist $a$, the part where the heat is greatest, prevents the sudden gusts of cold air into the furnace from altering the temperature of the pot. In case a pot should crack and fall to pieces, the molten glass will be caught in the cup, in which the fusion can be carried on until it be convenient to draw the fires and remove it.

The cup B is shown cylindrical, conforming with the configuration of the waist, but I wish it distinctly understood that I do not confine myself to any particular form.

What I claim as my invention, and desire to secure by Letters Patent, is—

Enclosing the waist $a$ and bottom of the pot, A, within a cup, B, when constructed and arranged as and for the purpose herein specified and described.

In testimony whereof, I hereunto sign my name to this specification in presence of two subscribing witnesses.

WILLIAM H. CAPEWELL.

Witnesses:
FRANCIS D. PASTORIUS,
W. W. DOUGHERTY.